Patented Dec. 4, 1934

1,982,651

UNITED STATES PATENT OFFICE 1,982,651

PREPARATION OF RESINOUS CONDENSATION PRODUCTS FROM PHENOLS AND ALDEHYDES

Martin Florenz, Erkner, near Berlin, Germany, assignor to Bakelite Gesellschaft mit beschrankter Haftung, Berlin, Germany No Drawing. Application September 4, 1931, Serial No. 561,254. In Germany September 9, 1930

5 Claims. (Cl. 260—4)

This invention relates to resinous condensation products from phenols and aldehydes and their preparation.

In preparing resins from phenols and aldehydes which are hardenable by heating it is known that bases, basic salts or salts engendering bases in a side reaction can be used as condensing agents. It is likewise known that heat-hardenable resins can be obtained with acid catalysts provided that formaldehyde is used in large excess and the acid is present in comparatively large quantities. Small proportions of acids or acid forming salts serve as condensing agents in the preparation of permanently fusible and soluble resins or the so-called novolaks. But up to the present time it has not been possible to obtain the permanently fusible and soluble type of phenol-aldehyde resins when using an alkali in any form as a condensing agent.

Novolaks can be prepared with acids as catalysts without any difficulty so long as pure phenol is used. However when a commercial phenol which contains in addition to phenol the three isomeric cresols and generally xylenols also, is used it will be found that because of the difference in reaction rate of the different phenols present only a comparatively low yield of resin is obtained by following the same procedure as with pure phenols. If the reaction period is lengthened to increase the yield, the reaction mass becomes so viscous, due to the different speeds of reaction between the various phenols and the aldehydes, that the distillation of the volatile by-products becomes difficult and accordingly a solid resin can not be obtained.

I have now found that non-heat-hardenable resins or novolaks which can be reduced to a solidified form by evaporation and which can be melted to a thin liquid are obtainable from the commercial form of phenol and with a good yield when a basic catalyst is used. It is important that the reaction ingredients, phenol, aldehyde and contact agent be present in certain proportions and the reaction be continued by heating for a sufficiently long period. Thus a heat-hardenable resin results from heating under a reflux condenser or an air-cooled ascension pipe 100 parts of commercial phenol, 40 parts of 40 per cent formaldehyde and 10 parts of 25 per cent aqueous ammonia after reacting for 45 minutes; but if the same mixture is boiled for two hours, a novolak is obtained. In this reaction the mixture should contain not less than 10 per cent of the aqueous ammonia based on the phenol content. When the proportion of ammonia is doubled, the same results follow; a heat-hardenable resin forms in a short reaction period and a novolak after a long reaction period. The novolaks so made are objectionable in that the resins are very viscous thus making distillation or removal of volatiles a difficult matter.

Novolaks which remain as thin liquids after a long reaction period are obtainable from phenols and basic condensing agents in good yield and solidifiable by evaporation if the molecular proportions of phenols to aldehydes and volatile bases is carefully maintained and the reaction is carried on in such a manner that the volatile base can escape while the less volatile phenols are returned. This is made possible by using an air cooled ascension pipe instead of a reflux condenser. The escaping vapors, principally volatile bases and water can be condensed and collected. When the reaction is complete the usual vacuum distillation is applied.

The molecular proportions of phenol to formaldehyde to volatile base found preferable is 13 to 7 to 5. This is the maximum aldehyde proportion as well as the optimum that can be used since the addition of only one mole of formaldehyde, i. e. a proportion of 13 to 8 to 5 yields a heat-hardenable resin. More than 5 mols of a volatile base to 13 mols of phenol, however, can be used. The proportion can be varied considerably provided the amount of formaldehyde does not exceed 7 mols to 13 mols of phenol and the quantity of volatile base is not less than 10 per cent of a 25% aqueous ammonia based on the phenol or equivalent quantity of other volatile bases.

Cresol can be used alone or in admixture with phenols or $\beta$ naphthol or with multivalent phenols depending on the intended use of the novolaks. Formaldehyde and its polymers or substances yielding formaldehyde as hexamethylenetetramine can be used as the aldehyde ingredient; with a substance such as hexamethylenetetramine, less of the volatile base is required. The preferred base is ammonia but pyridine or trimethylamine can be used. Part of the phenol can be substituted by substances such as urea and its derivatives which form condensation products with formaldehyde or its equivalents.

*Example 1.*—12 kilos of commercial phenol of the kind used for phenol-formaldehyde resins are heated with 4.4 kilos of 40% formaldehyde and 2.9 kilos of 25 per cent aqueous ammonia for 2½ hours in a kettle provided with a long air-cooled ascension pipe. The pipe is connected with an inclined condenser. During the heating operation the phenols are returned while the aqueous ammonia distills over. Some phenol is carried with the water vapor but only little formaldehyde escapes. To increase the yield there can be added formaldehyde to about 10% of the original quantity, i. e. 440 grams in the present case, and the reaction continued for another twenty minutes. Larger quantities require a proportionately increased time of reaction. The reaction is preferably carried on until only traces of ammonia appear in the vapors or condensate. Then distillation under a vacuum is applied until a solidified resin results. A yield of about 12.2 kilos of a reddish-brown resin melting at about 70° C. is obtained. In spite of the large quantity of ammonia employed the nitrogen content of the resin is only about 1.5%.

Example 2.—2.4 kilos of cresol, 0.57 kilos naphthol and 1.05 kilos of 40% formaldehyde are reacted in the presence of 0.8 kilos of pyridine as in Example 1. Evaporation under a vacuum yields 2.3 kilos of resin having a melting point of about 64° C.

Example 3.—3.6 kilos cresol, 0.36 kilos urea and 0.45 kilos of hexamethylenetetramine are treated as in Example 1.

Dyes, plasticizers, hardening agents and the like may be added to the reaction mass or to the resin before, during or after the reaction.

I claim:

1. Process of preparing novolak resins of the phenolic type which comprises reacting in an aqueous medium not more than 7 effective methylene mols of a methylene containing agent with 13 mols of a mixture of resin-forming components including a phenol having different rates of reaction with the methylene agent in the presence of a base as a condensing agent, the amount of said base corresponding to not less than 10 per cent by weight of the mixture of 25 per cent aqueous ammonia, and continuing the reaction by heating for a substantial period of time after the reaction has reached the stage of a heat-hardening resin.

2. Process according to claim 1 in which the mixture of resin-forming components is commercial phenol having a cresol present therein.

3. Process of preparing novolak resins of the phenolic type which comprises reacting in an aqueous medium not more than 7 effective methylene mols of a methylene-containing agent with 13 mols of a phenol admixed with appreciable quantities of a resin-forming reactant having a different rate of reaction with the methylene-containing agent in the presence of a volatile base as a condensing agent, the amount of said base corresponding to not less than 10 per cent by weight of the phenol of 25 per cent aqueous ammonia, and continuing the reaction by heating for a substantial period of time after the reaction has reached the stage of a heat-hardening resin.

4. Process of preparing novolak resins of the phenolic type which comprises reacting in an aqueous medium not more than 7 effective methylene mols of a methylene-containing agent with 13 mols of a phenol admixed with appreciable quantities of a resin-forming reactant having a different rate of reaction with the methylene-containing agent in the presence of a volatile base as a condensing agent, the amount of said base corresponding to not less than 10 per cent by weight of the phenol of 25 per cent aqueous ammonia, returning a vaporized phenol to the reaction mass, and carrying off vaporized base and water until the base is largely removed from the reaction mass.

5. Process of preparing novolak resins in accordance with claim 4 in which the admixture of phenols is commercial phenol having phenol and a cresol present therein.

MARTIN FLORENZ.